United States Patent Office 2,876,512
Patented Mar. 10, 1959

2,876,512

SHELL MOLDING

Julius M. Bleuenstein, Detroit, Mich., assignor to Ford Motor Company, Dearborn, Mich., a corporation of Delaware No Drawing. Application November 16, 1953
Serial No. 392,463

4 Claims. (Cl. 22—193)

This invention lies in the field of metal founding and more particularly in that part of the founding art which is concerned with the preparation of resin bonded sand molds and cores. The use of synthetic resin bonded sand for molds and cores has advanced greatly in recent years since the adoption of the so-called C process to large scale production. This C process which is also referred to as the Croning process has been so thoroughly discussed in the current literature that a detailed description is not thought to be necessary.

In the conventional operation of the C process, a sand is mixed with three to ten percent of a dry phenol aldehyde resin which resin has been partially reacted, but in which the polymerization is sufficiently incomplete to permit it to soften and then set on the hot metal pattern. While the usual C molding process represents a tremendous advance in the founding art, it is still plagued by two outstanding disadvantages. The first is the cost of the resin and the second is the dusty conditions engendered in the handling of the dry sand resin mixture. The instant invention has been developed in an effort to minimize both of these difficulties.

Instead of a resin which has been polymerized until it is solid at room temperatures, use is made of one which is prepared in a normally liquid condition. Such a resin may be prepared by reacting a phenolic material and an aldehyde in an aqueous medium and interrupting the polymerization reaction while the product is still liquid, water soluble, and highly water miscible. The resin batch is prepared with an excess of formaldehyde over the phenolic constituent and an alkaline catalyst is employed. When the reaction is stopped, an excess of free formaldehyde usually remains. This resin may be used either in the concentration produced in the resin kettle or it may be concentrated in vacuum to give any desired solids content as long as the liquid nature of the product is not altered.

This liquid resin is added to a quantity of previously heated sand and vigorously agitated or mulled until it has reacted to the desired extent. While reliance may be placed strictly upon the phenolic-aldehyde mixture to supply the resinous constituents, the process may be distinctly improved both economically and as far as mold strength is concerned by reacting a portion of the formaldehyde with a natural material such as Vinsol, a dark-colored, hard, pine resin which is substantially insoluble in petroleum hydrocarbons and has a methoxy content of 3 to 7 percent, or any similar material capable of reacting with aldehydes to form high melting resins. As the mulling of the hot sand resin mixture proceeds, its consistency will approach that of a thick, flowable slurry. When the reaction has been carried to the desired point, the material is removed from the hot muller and transferred to a cold muller. Here is added any necessary materials to prepare the sand for use on the hot pattern, and the mulling is continued until the mix is cold. This produces a pulverulent, highly flowable molding sand which is almost completely dust free and will produce satisfactory molds or cores in ordinary commercial practice.

When preparing molding sand using only phenolic-aldehyde resins as binders, it is usually necessary to add a resinification catalyst to the material in the hot muller. This type of catalyst is well known in the resin art. Typical catalysts are lime, hydrochloric acid and oxalic acid. If expedient, the catalyst may be added to the heated sand along with the resin, or the resin may be added to the heated sand and the catalyst added after a period of mixing. In any event, the addition of the catalyst should be regulated in view of the other conditions so that the resinification reaction does not proceed too far in the hot sand.

When preparing molding sand using Vinsol as an adjuvant to the phenolic-aldehyde type of resin, the use of a catalyst is usually unnecessary in view of the catalytic properties of the Vinsol itself. Under special circumstances it may be necessary to employ a catalyst with the Vinsol, but this is usually unnecessary.

A typical liquid resin employable in the present invention was compounded with two mols of formaldehyde to each mol of phenol. Sodium hydroxide, the amount of 1.1 percent by weight was employed as a catalyst and the pH of the liquid resin was 8.3. It was concentrated until the solid material amounted to 70 percent. The free aldehyde concentration was 4 percent. This gave a stable liquid resin capable of dilution with as much as 20 parts of water without separation. An initial batch of this liquid resin was mixed with 38.6 pounds of No. 90 AFS sand, the temperature of the sand at the outset being 300° F. The liquid resin was employed to the extent of 1000 grams. In addition to the sand and phenolic-aldehyde resin, 400 grams of Vinsol was added. This material was mulled for 4 minutes, during which time the temperature decreased to 290° F. At the end of the hot mulling, 25 grams of hexamethyltetramine and 15 grams of magnesium stearate was added. This gave a very satisfactory resin exhibiting a tensile strength of 440 pounds per square inch and a melting point of 210° F. This tensile strength was determined in the manner conventional in testing foundry sands. The melting point was determined by means of a substantial iron bar heated at one end by a gas flame while the other end was permitted to remain at atmospheric temperature. To determine a melting point, the sand to be tested is sprinkled along the bar from the hot end to the cold end and permitted to remain undisturbed for one minute. At the expiration of one minute, the bar is lightly contacted with a brush and the temperature of the bar taken at the coldest location at which the mixture has adhered to the bar. This melting point test is, of course, perfectly empirical but it has been found to yield an accurate measure of the suitability of sand for shell mold as contradistinguished for sand to be used for core blowing. Experience has taught that sands exhibiting a melting point substantially below 190° F. will peel from the hot pattern when it is inverted.

A second sand batch was made similar to that described above except the resin content was lowered to 700 grams and the Vinsol raised to 700 grams. The temperatures were the same and the procedure was varied by adding all of the Vinsol, mulling for three minutes, then adding the liquid resin and mulling for three minutes more. This procedure was necessary due to the high reactivity of the Vinsol and the danger of incompletely coating the sand with resin Vinsol polymer. This yielded a sand having a melting point of 210° F. and a tensile strength of 420 pounds per square inch.

A third batch was prepared using a sodium hydroxide treated Vinsol instead of the ordinary commercial Vinsol. This product is characterized by its ready water solubility The dry sodium hydroxide treated Vinsol was mixed with the water solution of resin in the proportions of 400 grams of Vinsol to 1,000 grams of resin. Sufficient water was added to insure a stable solution. This solution was added to 38.6 pounds of sand which had been previously heated to 300° F. This hot sand, resin mixture was mulled for nine minutes and emerged from the muller at a temperature of 280° F. The product after cold mulling with 15 grams magnesium stearate exhibited a melting point of 190° F. and a tensile strength of 522 pounds per square inch and was completely satisfactory for shell molds as well as cores.

The process described herein takes advantage of the fact that an aqueous solution of a resin may be uniformly distributed on the surface of each sand grain. After such a uniform coating of the partially reacted resin in water solution has been applied to the individual sand grains, it is necessary that the water in which the resin is dissolved as well as the water formed when the phenol and aldehyde react be eliminated without permitting further substantial polymerization of the resin to a point at which it becomes incapable of further setting upon the application of heat.

Zinc stearate may be freely substituted for a portion or all of the magnesium stearate.

I claim as my invention:

1. The process of producing a founding shell mold comprising heating a mass of sand, adding to the heated sand a minor percentage of an aqueous solution of an aldehyde rich, water soluble and water dilutable phenolic-aldehyde resin and a resinification catalyst, agitating the hot sand, resin mixture until the water of solution and water of reaction are substantially all evaporated and a water free, pasty, hot mass results, cooling the sand-resin mixture before polymerization has advanced substantially, mulling the cooled mass to produce a dustless, dry, sand-resin material, applying this material to a pattern and permitting the resin to cure on the pattern to produce a mold.

2. The process of producing a founding shell mold comprising heating a mass of sand, adding to the heated sand a minor percentage of an aqueous solution of an aldehyde rich, water soluble and water dilutable phenolic-aldehyde resin and a resinification catalyst, agitating the hot sand, resin mixture until the water of solution and water of reaction are substantially all evaporated and a water free, pasty, hot mass having a melting point of at least 190° F. results, cooling the sand-resin mixture before polymerization has advanced substantially, mulling the cooled mass to produce a dustless, dry, sand-resin material, applying this material to a heated pattern and permitting the resin to cure on the pattern to produce a mold.

3. The process of producing a founding shell mold comprising heating a mass of sand, adding to the heated sand a minor percentage of an aqueous solution of an aldehyde rich, water soluble and water dilutable phenolic-aldehyde resin and a dark-colored, hard, pine resin which is substantially insoluble in petroleum hydrocarbons and has a methoxy content of 3 to 7 percent, agitating the hot sand, phenolic-aldehyde resin, pine resin mixture until the water of solution and water of reaction are substantially all evaporated and a water free, pasty, hot mass results, cooling the sand-resin mixture before polymerization has advanced substantially, mulling the cooled mass to produce a dustless, dry, sand, phenolic resin, pine resin material, applying this material to a heated pattern and permitting the resin to cure on the pattern to produce a mold.

4. The process of producing a founding shell material comprising heating a mass of sand, adding to the heated sand a minor percentage of an aqueous solution of a water soluble dark-colored, hard, pine resin which is substantially insoluble in petroleum hydrocarbons and has a methoxy content of 3 to 7 percent and a water soluble and water dilutable, phenolic-aldehyde resin, agitating the hot sand phenolic-aldehyde resin, pine resin mixture until the water of solution and water of reaction are substantially all evaporated and a water free, pasty, hot mass results, cooling the sand-resin mixture before polymerization has advanced substantially and mulling the cooled mass to produce a dustless, dry, sand-resin mixture, applying this material to a heated pattern and permitting the resin to cure on the pattern to produce a mold.

References Cited in the file of this patent

UNITED STATES PATENTS

| | | |
|---|---|---|
| 2,193,026 | Hall | Mar. 12, 1940 |
| 2,407,225 | Dixon | Sept. 10, 1946 |
| 2,412,652 | Rosenthal | Dec. 17, 1946 |
| 2,422,118 | Meyer | June 10, 1947 |
| 2,521,614 | Valyi | Sept. 5, 1950 |
| 2,706,188 | Fitko et al. | Apr. 12, 1955 |
| 2,751,650 | Froberger | June 26, 1956 |

FOREIGN PATENTS

| | | |
|---|---|---|
| 683,239 | Great Britain | Nov. 26, 1952 |

OTHER REFERENCES

Hercules Vinsol Resin, copyright 1951, 16 pages.
American Foundryman, August 1952, page 44 relied on.
The Foundry, August 1950, page 216 (column 2) relied on.